United States Patent
Mochizuki (10) Patent No.: US 7,886,954 B2
(45) Date of Patent: Feb. 15, 2011

(54) SOLDER HANDLING TEMPERATURE CONTROLLER WITH TEMPERATURE LOCK MECHANISM

(75) Inventor: Toshikazu Mochizuki, Osaka (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 12/600,255

(22) PCT Filed: May 15, 2007

(86) PCT No.: PCT/JP2007/059952

§ 371 (c)(1),
(2), (4) Date: Nov. 13, 2009

(87) PCT Pub. No.: WO2008/139623

PCT Pub. Date: Nov. 20, 2008

(65) Prior Publication Data

US 2010/0308102 A1  Dec. 9, 2010

(51) Int. Cl.
*B23K 3/00* (2006.01)
(52) U.S. Cl. .............................. 228/8; 228/51; 219/229; 219/241
(58) Field of Classification Search ...................... None
See application file for complete search history.

(56) References Cited

U.S. PATENT DOCUMENTS

| | | | | | |
|---|---|---|---|---|---|
| 3,883,716 | A | * | 5/1975 | Fortune | 219/241 |
| 3,962,562 | A | * | 6/1976 | Carter et al. | 219/490 |
| 3,990,623 | A | * | 11/1976 | Fortune | 228/57 |
| 4,698,774 | A | * | 10/1987 | Abe et al. | 700/212 |
| 4,708,278 | A | * | 11/1987 | Opfer | 228/122.1 |
| 4,861,967 | A | * | 8/1989 | Yoshimura | 219/241 |
| 4,924,067 | A | * | 5/1990 | Wilhelmson | 219/241 |
| 4,945,210 | A | * | 7/1990 | Yoshimura | 219/241 |
| 5,014,210 | A | * | 5/1991 | Postlewait et al. | 700/207 |
| 5,408,072 | A | * | 4/1995 | Nagase | 219/616 |
| 5,495,093 | A | * | 2/1996 | Griffith | 219/497 |
| 5,928,536 | A | * | 7/1999 | Lee | 219/229 |
| 6,093,915 | A | * | 7/2000 | Postlewait et al. | 219/494 |

(Continued)

FOREIGN PATENT DOCUMENTS

EP  2156915 A1  2/2010

(Continued)

*Primary Examiner*—Kiley Stoner
(74) *Attorney, Agent, or Firm*—Squire, Sanders & Dempsey (US) LLP (57) ABSTRACT

A solder handling temperature controller comprises a body (10) of the solder handling temperature controller, a rotating shaft (77) housed in the body (10) and adapted to be rotatable about its axis, a set temperature changing means (75) adapted to change a set temperature according to a rotation angle of the rotating shaft (77), a rotary knob (20) supported by the body (10) in a rotatable manner relative to the rotating shaft (77), and a temperature lock key (40) adapted to be selectively insertable into and withdrawable from the body (10) in a position coaxial with the rotating shaft (77) and the knob (20), and, in an inserted state thereof, to mechanically couple the rotating shaft (77) and the knob (20) together to allow them to be interlockingly rotated, wherein, when the temperature lock key (40) is withdrawn from the body (10), the coupling between the rotating shaft (77) and the knob (20) is released to prohibit the change of the set temperature by the rotation of the knob (20).

7 Claims, 9 Drawing Sheets

U.S. PATENT DOCUMENTS

| | | | |
|---|---|---|---|
| 6,329,641 B1 * | 12/2001 | Miyazaki et al. | 219/497 |
| 6,580,050 B1 * | 6/2003 | Miller et al. | 219/85.16 |
| 2005/0121495 A1 * | 6/2005 | Yokoyama | 228/9 |
| 2009/0050673 A1 * | 2/2009 | Althoff et al. | 228/11 |

FOREIGN PATENT DOCUMENTS

| | | |
|---|---|---|
| JP | 64-5772 | 1/1989 |
| JP | 02-22144 | 6/1990 |

* cited by examiner

SOLDER HANDLING TEMPERATURE CONTROLLER WITH TEMPERATURE LOCK MECHANISM

TECHNICAL FIELD

The present invention relates to a temperature controller usable with a solder handling device typified by a solder iron, a solder removal device or the like, and capable of appropriately changing and locking a set temperature of a tip, a nozzle or the like of the solder handling device. In particular, the present invention relates to a temperature controller designed to mechanically lock the set temperature.

BACKGROUND ART

In assembling operations for various electric products using electronic components such as IC, soldering is frequently employed in electrical junctions. Recent years, along with progress in automatization of assembling, automatization in soldering operation has also been promoted. However, there remain quite a lot of processes requiring a soldering operation by hand (manual soldering).

Although manual soldering is typically performed using a soldering ion, a tool for manually handling solder includes various devices other than the soldering iron, such as a solder removal device and a hot-air blowing device. The solder removal device is designed to re-melt and remove a solder which has already been soldered. The hot-air blowing device is designed to blow hot air against a solder to melt the solder, and used for both soldering and solder removal. In this specification, they will be collectively referred to as "solder handling device". Further, an operation of handling solder using a solder handling device will be referred to as "solder handling operation".

It is desirable that a solder handling operation is performed at an adequate temperature. This adequate temperature depends on a type of solder, a type of solder handling device, a size and a shape of a tip or the like of a solder handling device, or an allowable temperature limit of an electronic component, etc. For example, recent years, solder containing almost or absolutely no lead (lead-free solder) has been regarded as advantageous in view of the global environment, and increasingly used. The lead-free solder has a melting point greater than that of tin-lead eutectic solder by several tens of degrees Celsius, so that an adequate temperature in case of using the lead-free solder becomes greater than that in case of using the tin-lead eutectic solder.

There has been known a solder handling device intended to meet the above need and equipped with a temperature controller operable to adjust a set temperature.

However, if a set temperature based on the temperature controller is in a changeable state at any time, a solder handling operator is likely to perform a solder handling operation at an inadequate set temperature. For example, due to operator's enthusiasm to aim at improvement in operating efficiency, the operator is liable to set a set temperature higher than an adequate temperature. The reason is that, as a set temperature becomes higher, solder is more easily melted to provide more improved operating speed. This usage is undesirable, because it causes a negative effect, such as thermal damage of electronic components.

In order to avoid such an undesirable situation, the temperature controller may have a mechanism for locking a set temperature once it is set (temperature lock mechanism), wherein only a specific person (hereinafter referred to as "set-temperature manager") is permitted to release the temperature lock (see, for example, the following Patent Document 1).

A system disclosed in the Patent Document 1 comprises a setting card. This setting card has an identification code indicating that an owner of the setting card is a set-temperature manager. Further, a change of a set temperature is permitted only when the setting card is inserted into a card slot provided in a body of a temperature controller and then the identification code is properly authenticated.

Thus, the set-temperature manager can appropriately set a set temperature after inserting the setting card into the card slot, and then lock the set temperature by withdrawing the setting card from the card slot.

The system disclosed in the Patent Document 1 is a digital type configured such that a value of a set temperature is input from a keyboard, and the identification code of the setting card is electrically authenticated.

In addition to the digital type, the input configuration for a set temperature includes an analog type. For example, there has been known one type comprising a variable resistor, wherein a set temperature is changed according to a resistance value of the variable resistor. This variable resistor includes a rotating shaft, wherein the resistance value is changed according to a rotation angle of the rotating shaft. The rotating shaft is coupled to a rotary knob which is adapted to be rotated to allow the rotation angle of the rotating shaft to be changed. The temperature lock mechanism using the setting card as in the Patent Document 1 is unsuitable for such an analog type. Thus, the temperature lock in the analog type has heretofore been performed by physically fixing the knob. For example, there has been known a mechanism in which a locking bolt or a locking nut is tightened using a specialized tool (wrench or driver) to thereby prohibit the rotation of the knob.

However, in such a temperature lock mechanism, a temperature lock/release operation becomes cumbersome and complicated.

[Patent Document 1] JU 2-22144B

DISCLOSURE OF THE INVENTION

In view of the above circumstances, it is an object of the present invention to provide a solder handling temperature controller capable of mechanically performing temperature lock in an easy and adequate manner.

In order to achieve the above object, the present invention provides a solder handling temperature controller designed to control a solder handling device including a soldering iron to have a given set temperature, under a condition that it is in connected relation with the solder handling device or incorporated in the solder handling device. The solder handling temperature controller comprises: a body of the solder handling temperature controller; a rotating shaft housed in the body and adapted to be rotatable about an axis thereof; a set temperature changing means adapted to change the set temperature according to a rotation angle of the rotating shaft; a rotary knob supported by the body in coaxial relation with the rotating shaft and in a rotatable manner relative to the rotating shaft; and a temperature lock key adapted to be selectively insertable into and withdrawable from the body in a position coaxial with the rotating shaft and the knob, and, in an inserted state thereof, to mechanically couple the rotating shaft and the knob together to allow them to be interlockingly rotated, wherein, in a state where the temperature lock key is withdrawn from the body, the coupling between the rotating shaft and the knob is released to prohibit the change of the set temperature by the rotation of the knob.

In the structure of the solder handling temperature controller, when the temperature lock key is inserted into a body, the rotating shaft and the knob are coupled together to allow them to be interlockingly rotated. Thus, through an operation of rotating the knob, the rotation angle of the rotating shaft can be changed, i.e., the set temperature can be changed (release of temperature lock).

On the other hand, when the temperature lock key is withdrawn from the body, the coupling between the rotating shaft and the knob is released. The knob is supported by the body in a rotatable manner relative to the rotating shaft, so that, even if the knob is rotated in this state, it will just undergo a lost motion without causing any rotation of the rotating shaft. This means that the change of the set temperature is precluded to establish the temperature lock.

In the above manner, the establishment and release of the temperature lock can be easily performed only through the insertion and withdrawal of the temperature lock key.

BEST MODE FOR CARRYING OUT THE INVENTION

With reference to the drawings, a first embodiment of the present invention will be described.

Figure 1:
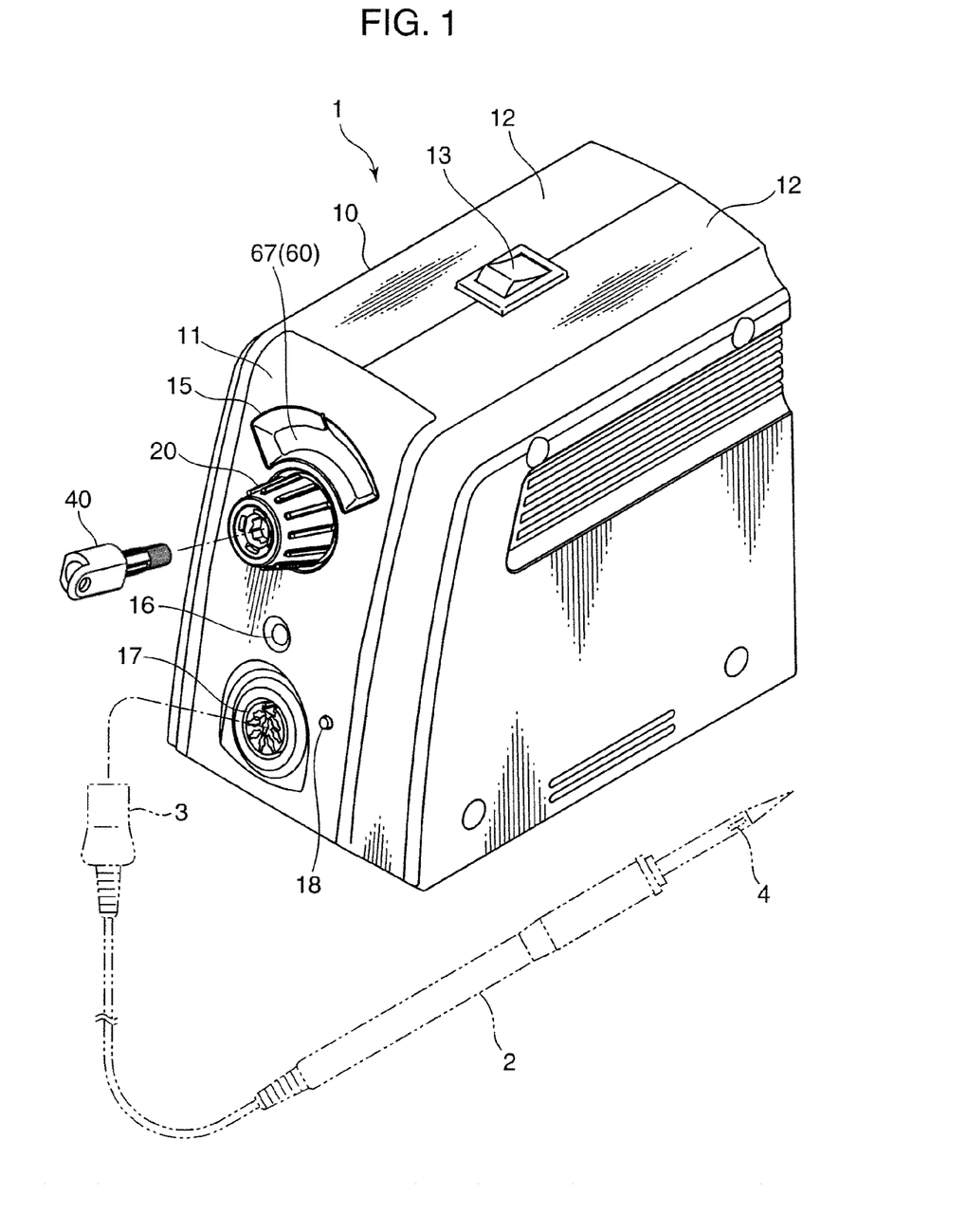
FIG. 1 is a perspective view of a solder handling temperature controller according to a first embodiment of the present invention.

FIG. 1 is a perspective view of a solder handling temperature controller having a temperature lock mechanism, according to a first embodiment of the present invention.

Firstly, an outline of the solder handling temperature controller (hereinafter referred to as "controller 1") will be described. The controller 1 is used in combination with a solder handling device 2 adapted to be connected thereto. Although a soldering iron is shown in FIG. 1 by the two-dot chain line as a representative example of the solder handling device 2, it may be appropriately replaced with a solder removal device, a solder heating hot-air blowing device or the like.

The controller 1 is adapted to perform a temperature control of a heating mechanism incorporated in the solder handling device 2. Specifically, the controller 1 is operable to supply electric power to the solder handling device 2 to heat heating means (e.g., heater) incorporated in the solder handling device 2. The solder handling device 2 incorporates a temperature sensor 4 which is operable to detect a temperature or temperature-related information (e.g., voltage) of a heating target portion (in a case using a soldering iron, a soldering tip) and transmit the detected temperature or temperature-related information to a control circuit 71 (see FIG. 2) of a body 10. A user pre-designates a desired temperature of the heating target portion and sets the desired temperature in the control circuit 71. The control circuit 71 is operable to cross-check the set temperature with the temperature or temperature-related information transmitted from the temperature sensor 4 to adjust an amount of electric power to be supplied to the solder handling device 2, in such a manner as to allow a temperature of the heating target portion to converge to the set temperature.

In the following description, when it is necessary to discriminate between a user having authority to input and change a set temperature, and a user who lacks the authority, the former and the latter will be referred to as "set-temperature manager" and "operator", respectively.

Secondly, a structure of the controller 1 will be described. The controller 1 comprises a generally rectangular parallelepiped-shaped body 10, and a rod-shaped temperature lock key 40 adapted to be selectively attachable into and detachable from the body 10. The body 10 has a housing made up of a front panel 11 covering a front thereof and two side panels 12 covering remaining sides including a rear and a bottom thereof. A power switch 13 is provided on a top wall of the body 10. Although not illustrated in FIG. 1, a power cord 81 (see FIG. 2) is led out through a rear wall of the body 10.

The front panel 11 has a window 15, a knob 20, a power indicator lamp 16, a calibration offset button 18 and a socket 17 which are lined up in this order from an upper side thereof.

The window 15 is provided as a means to indicate a current set temperature, and formed as a through-hole penetrating between front and back surfaces of the front panel 11. A scale board 60 marked with a temperature scale 67 is disposed inside the body 10 and on an inner side of the window 15. The scale board 60 is adapted to be rotated coaxially with the knob 20 in conjunction with a change of a set temperature, so as to allow a specific mark on the temperature scale 67 corresponding to the post-change set temperature to be aligned with the window 15. A temperature indicated through the window 15 allows a user to recognize a current set temperature. Further, the indicated temperature is referred to when a set-temperature manager changes a set temperature and when the set-temperature manager performs an after-mentioned calibration. This indicated temperature will also be referred to particularly as "indicated set temperature".

The knob 20 is supported to protrude from an outer surface of the front panel, in a rotatable manner about an axis thereof extending in a direction approximately perpendicular to the front panel 11. The knob 20 is a rotary input means to allow the set-temperature manager to input or change a set temperature. In a state illustrated in FIG. 1, i.e., in a non-inserted state where the temperature lock key 40 is not inserted into the body 10, the knob 20 is uncoupled to an inside of the body 10, so that, even if a user rotates the knob 20, the knob 20 will undergo a lost motion.

The power indicator lamp 16 is adapted to be lighted when electric power is supplied to the body 10, and the power switch 13 is turned on.

The calibration offset button 18 (calibration switch) is a push button-type switch. In a calibration mode for correcting a deviation between an indicated set temperature and an actual temperature of the controlled object, the calibration offset button 18 is operated by the set-temperature manager.

An operation procedure and function of the calibration offset button 18 will be described later together with a description of the calibration mode.

The socket 17 is a body-side connector for connecting the solder handling device 2 to the body 10. Correspondingly, the solder handling device 2 is provided with a plug 3 adequately engageable with the socket 17. The transmitting/receiving of electric power and sensor signals is performed via the plug 3 and the socket 17.

The temperature lock key 40 is a component prepared separately from the body 10, and adapted to be selectively attachable to and detachable from the body 10. In the non-inserted state of the temperature lock key 40, the knob 20 undergoes a lost motion, as mentioned above. However, upon insertion of the temperature lock key 40, the knob 20 effectively functions to enable a change of a set temperature. More specifically, the knob 20 has, in an axial region thereof, an insertion hole for the temperature lock key 40 and the temperature lock key 40 can be insertedly attached in such a way that a distal end member of the temperature lock key 40 is inserted into the insertion hole.

Figure 2:
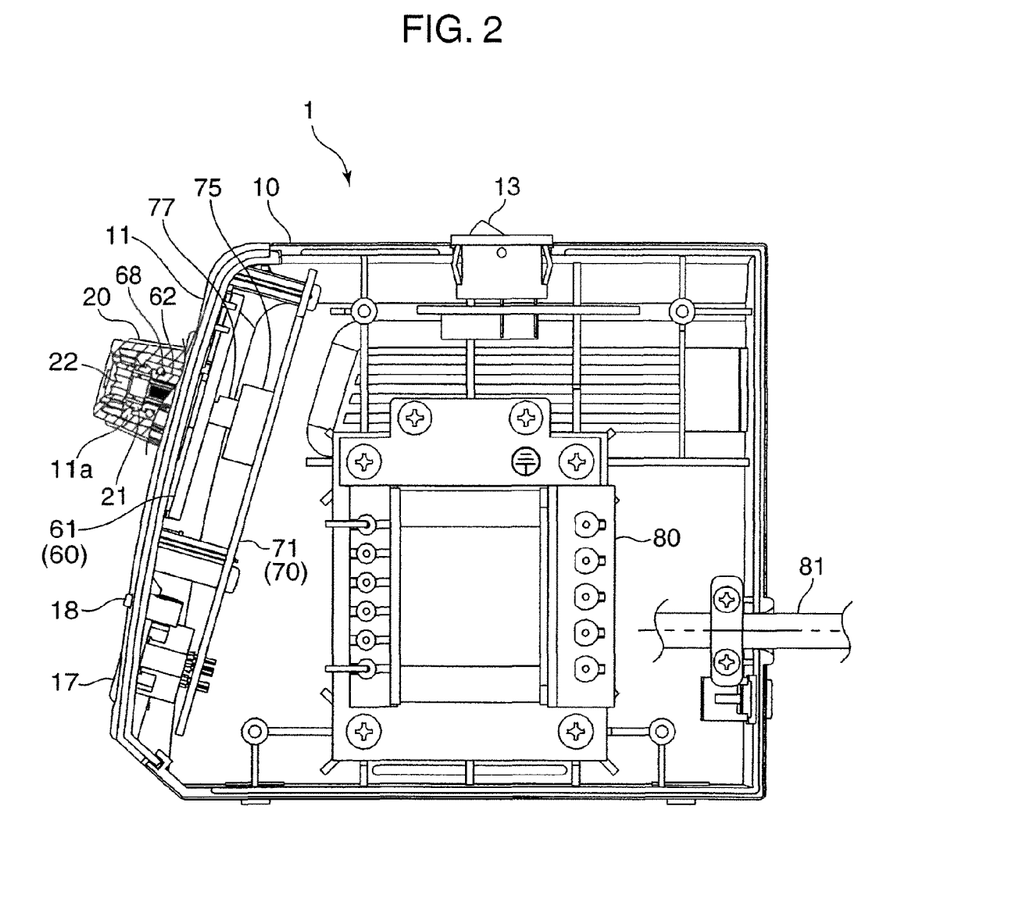
FIG. 2 is a side view of an inside of a body of the solder handling temperature.

FIG. 2 is a side view of an inside of the body 10 (a side view in a state after the side panel 12 on a front side of the drawing sheet is detached). The knob 20 is shown in a vertical section.

A power transformer 80 and a control board 70 connected to the power cord 18 and the power switch 13 are housed in the body 10. The control board 70 is disposed on the inner side of and in an approximately parallel relation to the front panel 11. The power indicator lamp 16, the socket 17 and the calibration offset button 18 are connected to the control board 70. The control circuit 71 including a CPU (not shown) is also mounted thereto to perform the aforementioned temperature control.

Further, a variable resistor 75 (set temperature changing means) is mounted on the control board 70. The control circuit 71 is operable to electrically read a resistance value of the variable resistor 75 to read a post-setting set temperature according to the read resistance value.

A rotating shaft 77 coaxial with a support shaft for the knob 20 is provided to protrude from the variable resistor 75 toward the front panel 11. The variable resistor 75 is configured such that the resistance value is changed according to a rotation angle of the rotating shaft 77.

Figure 3:
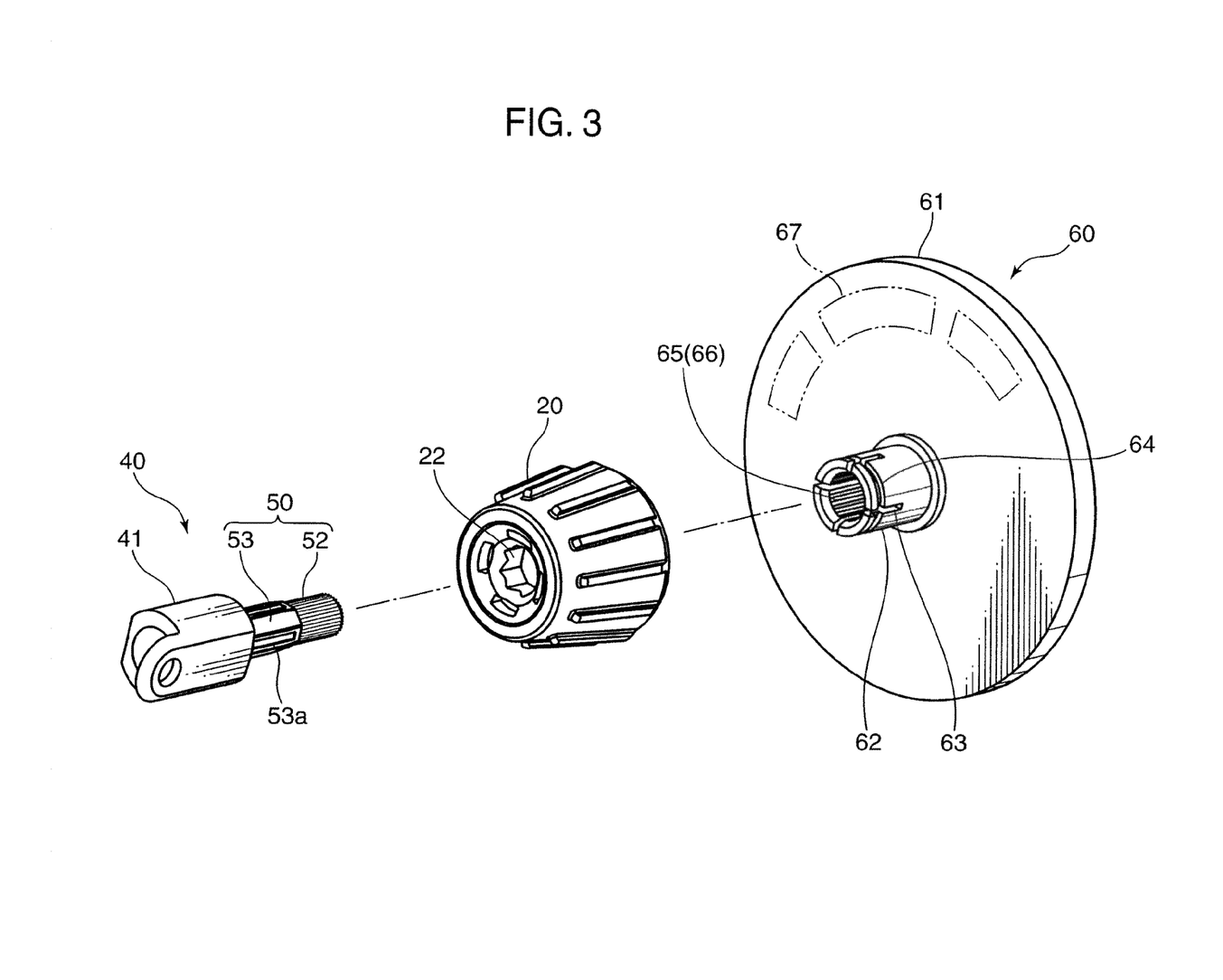
FIG. 3 is an exploded perspective view of components related to a temperature lock key of the solder handling temperature controller.

The scale board 60 is disposed between the front panel 11 and the control board 70, in such a manner that a plate-like portion 61 thereof becomes parallel to the front panel 11 and the control board 70. As shown in FIG. 3, the plate-like portion 61 of the scale board 60 has a circular disc shape. The temperature scale 67 is marked in a position on the plate-like portion 61 corresponding to the window 15 of the front panel 11. The temperature scale 67 may be directly printed or inscribed on the plate-like portion 61 or may be formed by putting a separate sheet, such as a sticker, printed with the scale. The temperature scale 67 may be one of numerical characters, scale lines and a mixture thereof. A rotation axis of the scale board 60 (centerline of a boss 62) is coaxial with the rotating shaft 77 of the variable resistor 75, and the scale board 60 and the rotating shaft 77 are fixed together to achieve this coaxial relation. In other words, the scale board 60 and the rotating shaft 77 are integrally rotated. Further, when the rotating shaft 77 is placed at a certain rotation angle, a set temperature corresponding to a resulting resistance value is set.

The boss 62 of the scale board 60 protrudes outwardly from the outer surface of the front panel 11. The front panel 11 has a cylindrical-shaped knob support shaft 11a formed to surround the boss 62 in coaxial relation with the boss 62. The knob support shaft 11a has a pawl formed on the side of a distal end thereof to protrude in a radially inward direction thereof.

The knob 20 is formed in a generally cylindrical shape, and an inner peripheral surface thereof is fitted on an outer peripheral surface of the knob support shaft 11a. This makes it possible to allow the knob 20 to be slidingly rotated around the knob support shaft 11a in a smooth manner. The knob 20 is formed with an engagement pawl 21 engageable with the pawl at the distal end of the knob support shaft 11a, so that the knob 20 is kept from dropping off from the knob support shaft 11a by an engagement therebetween.

FIG. 3 is an exploded perspective view of the temperature lock key 40, and the knob 20 and the scale board 60 which are components related to the temperature lock key 40. The temperature lock key 40 has a base end member 41 located on the side of one of axially opposed ends thereof and adapted, in an inserted state thereof, to be exposed, and a distal end member 50 located on the side of the other end, and adapted, in the inserted state, to be sunk into a side of the body 10 which includes the knob 20. The base end member 41 and the distal end member 50 are rotatable relative to each other about an axis of the temperature lock key 40.

The distal end member 50 has a first distal end portion 52 located on the side of a most distal end of the temperature lock key 40, and a second distal end portion 53 located on the side of the base end member 41 relative to the first distal end portion 52. The first distal end portion 52 is made up of a large number of (in the first embodiment, thirty-six) spline grooves extending in an axial direction of the temperature lock key 40. Differently, the second distal end portion 53 is formed in a generally octagonal shape in cross-section perpendicular to the axis (see FIG. 5).

Correspondingly, the inner peripheral surface of the knob 20 has a knob-side fitting region 22 formed in a generally octagonal shape in cross-section perpendicular to the axis and adapted to allow the second distal end portion 53 to be fitted thereinto. Further, the boss 62 of the scale board 60 has an inner peripheral surface serving as a rotating shaft-side fitting region 66 formed with a large number of spline grooves 65 adapted to allow the spline grooves of the first distal end portion 52 to be fitted thereinto.

Thus, when the distal end member 50 is inserted into the body 10, the first distal end portion 52 of the temperature lock knob 40 is fitted into the spline grooves 65 of the scale board 60, and the second distal end portion 53 is fitted into the knob-side fitting region 22 of the knob 20, so that the knob 20 and the scale board 60 can be integrally rotated through the distal end member 50 of the temperature lock key 40. The rotating shaft 77 of the variable resistor 75 and the scale board 60 are adapted to be integrally rotated, as mentioned above. Thus, in the inserted state of the temperature lock key 40, the knob 20 and the rotating shat 77 can also be integrally rotated.

The boss 62 of the scale board 60 has four cutouts 63 formed on the side of a distal end thereof at even intervals in a circumferential direction thereof to extend in an axial direction thereof. The boss 62 also has an O-ring groove 64 formed in an outer peripheral surface thereof at a position adjacent to the distal end. An O-ring 68 (see FIG. 2) is attached to the O-ring groove 64. This structure produces an action causing the boss 62 to be reduced in diameter, in a vicinity of the distal end of the boss 62, so that a click feeling during the insertion and withdrawal of the temperature lock key 40 can be enhanced while absorbing a fitting error of the spline grooves in manufacturing.

Figure 4:
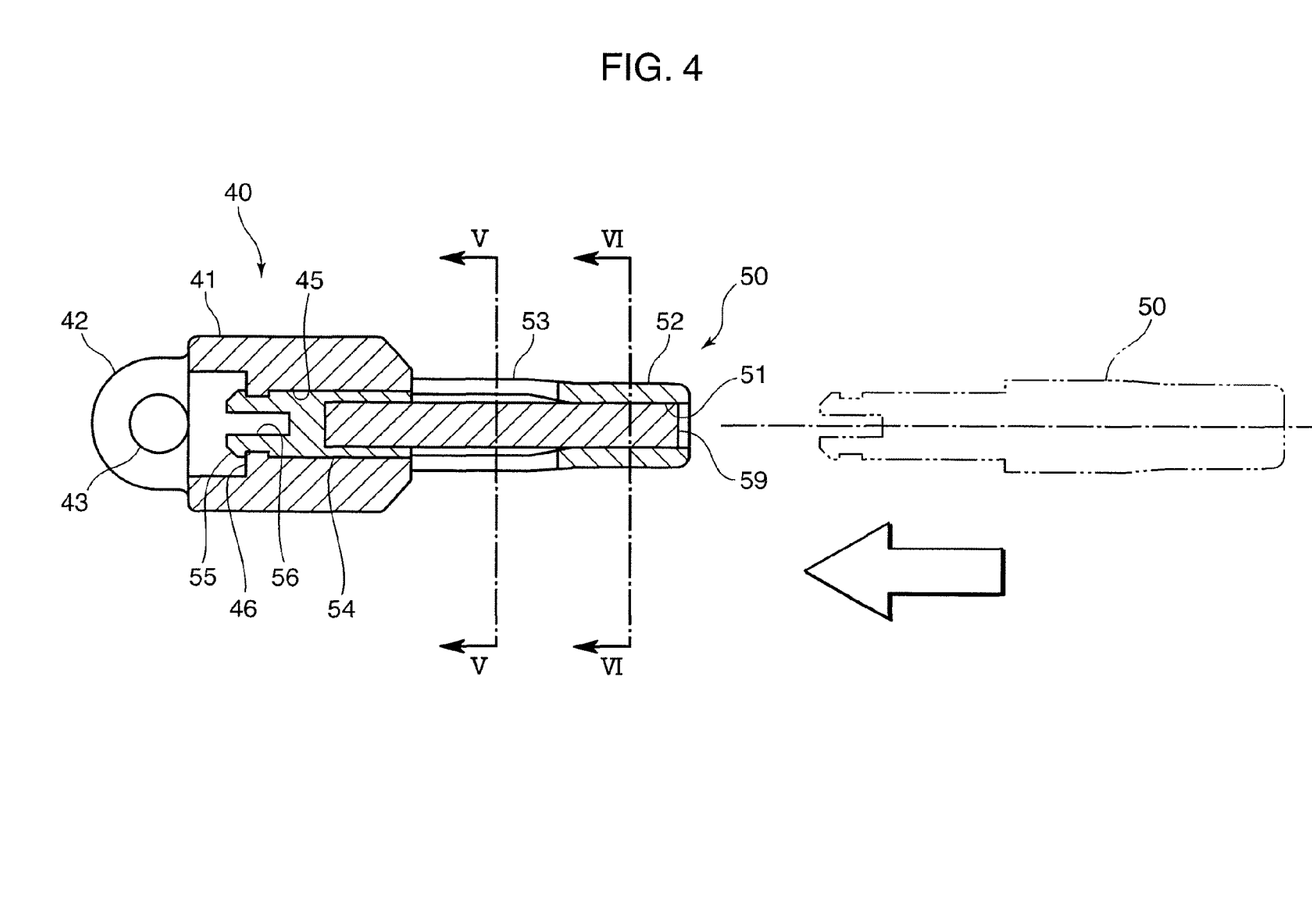
FIG. 4 is a vertical sectional view of the temperature lock key.

FIG. 4 is a vertical sectional view of the temperature lock key 40. The temperature lock key 40 consists primarily of the base end member 41, and the distal end member 50 prepared separately from the base end member 41. Each of the base end member 41 and the distal end member 50 is made of a resin material. The distal end member 50 further has an iron core 59 provided on a radially inward side thereof to ensure a strength thereof.

The base end member 41 has a generally cylindrical shape, and an outer peripheral surface of the base end member 41 is formed as if it is chipped off along a pair of mutually parallel planes extending in the axial direction (see FIG. 5) so that the set-temperature manager can easily grip the base end member 41. The base end member 41 has a plate-like protruding portion 42 provided on a base edge thereof and formed with a strap hole 43 suited to allow a strap (not shown) or the like to pass therethrough. The base end member 41 has an inner peripheral surface defining a distal-end-member insertion hole 45 fittable with a base end of the distal end member 50. The base end member 41 also has an engagement portion 46 formed in a vicinity of a base end of the distal-end-member insertion hole 45 to protrude in an inward direction thereof.

Correspondingly, the distal end member 50 has a distal end member-side base portion 54 formed on the side of the base end member 41 relative to the second distal end portion 53 and adapted to be inserted into the distal-end-member insertion hole 45 of the base end member 41. Dimensions for fitting between the distal-end-member insertion hole 45 and the distal end member-side base portion 54 are set to establish loose fitting. The distal end member-side base portion 54 has an engagement portion 55 formed on the side of a base end of the distal end member-side base portion 54 and adapted to be engaged with the engagement portion 46. Further, a cutout 56 is provided in a vicinity of the engagement portion 55 to facilitate a reduction in diameter of the engagement portion 55. An inner peripheral surface of the distal end member 50 is formed to define an iron-core holding region 51 adapted to receive and hold the iron core 59.

In a production process for the temperature lock key 40, the base end of the distal end member 50 (shown by two-dot chain line) holding the iron-core holding region 51 is inserted into the distal-end-member insertion hole 45 of the base end member 41. After the base end of the distal end member-side base portion 54 is brought into contact with the engagement portion 46, the insertion operation will be continued, so that a diameter of the outer peripheral surface in the vicinity of the engagement portion 55 is reduced to allow the engagement portion 55 to pass through the engagement portion 46 and then come into engagement with the engagement portion 46. Once the engagement portion 55 of the distal end member 50 is engaged with the engagement portion 46 of the base end member 41 in the above manner, the base end member 41 and the distal end member 50 are integrated together and hardly separated from each other. However, the distal-end-member insertion hole 45 and the distal end member-side base portion 54 are in loose-fitting relation, and therefore the base end member 41 and the distal end member 50 become rotatable to each other about the axis.

Figure 5:
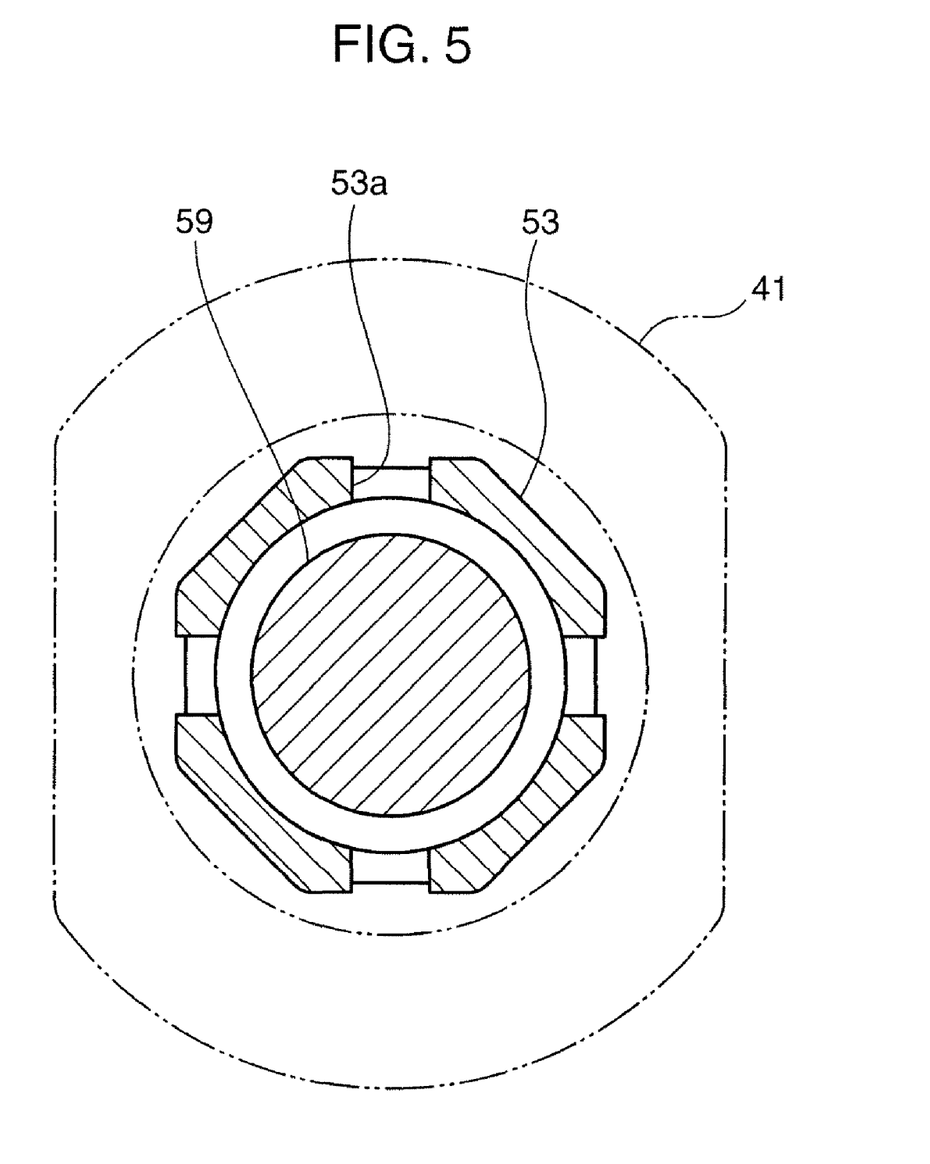
FIG. 5 is a sectional view taken along the line V-V in FIG. 4.

FIG. 5 is a sectional view taken along the line V-V in FIG. 4. As shown in FIG. 5, the outer peripheral surface of the second distal end portion 53 has a generally octagonal shape. Although the iron core 59 is provided to extend along the inner peripheral surface of the second distal end portion 53, a gap is formed between the iron core 59 and the inner peripheral surface. Cutouts 53a are alternately formed in eight facets defining the regular 8-sided shape to penetrate between the inner and outer peripheral surfaces (additionally see FIGS. 3 and 4). The cutouts 53a and the gap relative to the iron core 59 allow the second distal end portion 53 to be deformed in a radially inward direction relatively easily and to have a restoring force if the radially inward deformation occurs. According to the above structure, during an operation of inserting the temperature lock key 40 into the body 10, an insertion force can be reduced while absorbing a manufacturing error of fitting between the second distal end portion 53 and the knob-side fitting region 22. Further, after completion of the insertion operation, the second distal end portion 53 and the knob-side fitting region 22 can be easily placed in close contact relation so as to adequately transmit torque.

The outer peripheral surface of the second distal end portion 53 may have any polygonal shape other than an 8-sided shape. In this case, the knob-side fitting region 22 may be formed in a shape conforming to the polygonal shape. If the outer peripheral surface of the second distal end portion 53 is formed in one of a 3-sided shape, a 4-sided shape and a 5-sided shape, respective phases of the second distal end portion 53 and the knob-side fitting region 22 are hardly aligned with each other. Conversely, the outer peripheral surface of the second distal end portion 53 is formed in an 11 or more-sided shape, a high manufacturing accuracy is required, although the phase alignment becomes easy. The reason is that, if the accuracy becomes deteriorated, the shape comes closer to a circle to cause slip between contact surfaces and thereby preclude adequate torque transmission. In the first embodiment, some degree of phase misalignment is automatically absorbed by a lost motion of the knob 20 and the distal end member 50. Thus, it is preferable to form the outer peripheral surface of the second distal end portion 53 roughly in any one of 6 to 10-sided shapes.

Figure 6:
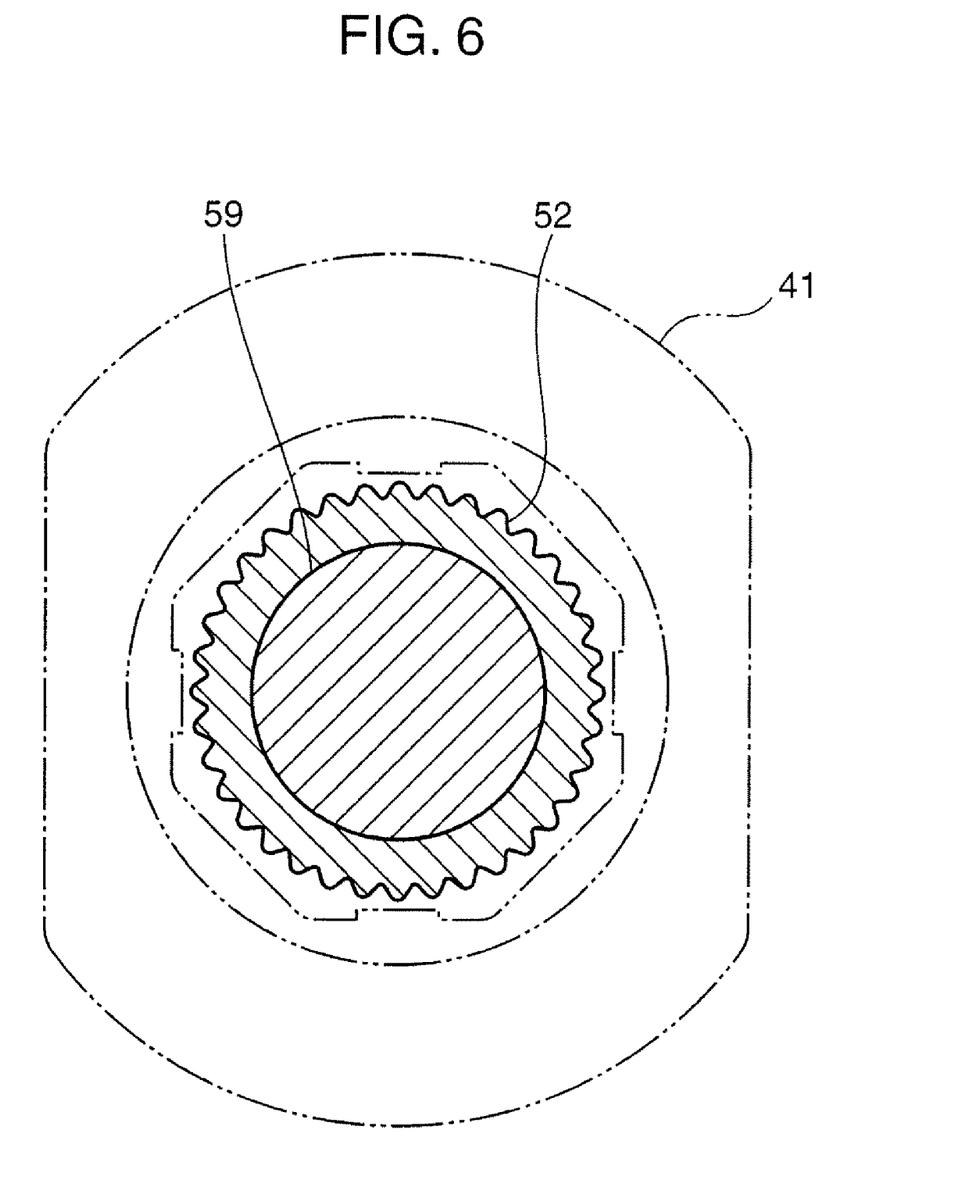
FIG. 6 is a sectional view taken along the line VI-VI in FIG. 4.

FIG. 6 is a sectional view taken along the line VI-VI in FIG. 4. As shown in FIG. 6, the first distal end portion 52 has thirty-six spline grooves formed at even intervals in a circumferential direction thereof. The spline fitting using such a large number of (preferably, twenty or more) spline grooves, makes it possible to significantly reduce a phase misalignment when the first distal end portion 52 of the temperature lock key 40 is fitted into the rotating shaft-side fitting region 66 of the scale board 60.

An operation procedure of the controller 1 will be described below. A user connects a plug 3 of a solder handling device 2 depending on a type of operation, to the socket 17. Further, the user connects the power cord 81 to a power supply, and turns on the power switch 13. Then, the user checks the power indicator lamp 16, because it should be consequently lightened.

Subsequently, the user performs the after-mentioned calibration according to need, and then inputs a set temperature depending on the connected solder handling device 2 and the type of operation. This input is performed by a set-temperature manager owning or managing the temperature lock key 40. The set-temperature manager inserts the temperature lock key 40 into the body 10. Consequently, the function of the knob 20 becomes effective. Then, the set-temperature manager rotates the knob 20 to adjust the temperature scale 67 to a position where a desired set temperature is indicated through the window 15. In conjunction with this operation, the rotating shaft 77 of the variable resistor 75 is also rotated, and the variable resistor 75 has a resistance value corresponding to the post-adjustment indicated set temperature.

After completion of the temperature setting, the set-temperature manager withdraws the temperature lock key 40 from the body. Then, an operator performs a soldering-related operation, while handling the solder handling device 2 in a state after the temperature setting is adequately performed in the above manner. In this state, even if the operator attempts to rotate the knob 20 so as to increase the set temperature, due to operator's enthusiasm to aim at improvement in operating efficiency, it is unable to change the set temperature, because the temperature lock key 40 is in the non-inserted state and thereby the knob 20 will undergo a lost motion. Thus, a solder handling operation at an adequate temperature will be maintained and continued, so that deterioration in quality of the solder handling operation is effectively suppressed.

In the mean time, when the set-temperature manager inserts the temperature lock key 40 into the body 10, he/she grips the base end member 41 and inserts the temperature lock key 40 into the body 10 from the side of the distal end thereof. In this case, a phase of the 8-sided shape of the second distal end portion 53 is not always aligned with a phase of the knob-side fitting region 22. Even in such a situation, a lost motion of the knob 20, and a lost motion of the distal end member 50 with respect to the base end member 41, makes it possible to eliminate the phase misalignment to allow fitting therebetween to be adequately performed.

Similarly, even in a situation where a phase of the spline grooves of the first distal end portion 52 is misaligned with a phase of the spline grooves 65 of the scale board 60, a lost motion of the distal end member 50 with respect to the base end member 41 makes it possible to eliminate the phase misalignment to allow fitting therebetween to be adequately performed.

Although the base end member 41 is exposed from the body in a state after the temperature lock key 40 is inserted into the body, the scale board 60 cannot be rotated even if the base end member 41 is rotated, because the base end member 41 is rotatable relative to the distal end member 50, so that, even if the base end member 41 is rotated, it will undergo a lost motion. In other words, the temperature lock key 40 cannot be used as substitute for the knob 20, and the scale plate 60 (or the rotating shaft 77) can be rotated (the set temperature can be changed) only if the knob 20 is rotated.

Calibration of the controller 1 will be described below. The control circuit 71 is operable to execute a calibration mode for correcting a deviation between an indicated set temperature and an actual temperature of a controlled object. Generally, such a deviation becomes larger along with an increase in duration of use. Thus, it is desirable to perform an operation of (calibration for) appropriately eliminating or reducing the deviation. A function of the controller 1 in the calibration operation will be described below in line with a calibration process.

(1) A set-temperature manager turns on the power switch 13 and waits until a temperature of the solder handling device 2 becomes stable.

(2) The set-temperature manager inserts the temperature lock key 40 into the body 10, and rotates the knob 20 to adjust an indicated set temperature to a given calibration temperature (e.g., 400° C.). Then, the set-temperature manager waits until the temperature of the solder handling device 2 becomes stable.

(3) After the temperature of the solder handling device 2 becomes stable, the set-temperature manager presses the calibration offset button 18. In response to the pressing of the calibration offset button 18, the control circuit 71 enters the calibration mode. The control circuit 71 temporarily stores a temperature (first temperature T1) at a time when the calibration offset button 18 is pressed (practically, the information to be stored may be a resistance value of the variable resistor 75 corresponding to the temperature T1; This may be applied to the following procedure). If the calibration temperature is 400° C., the first temperature T1 will be about 400° C.

(4) The set-temperature manager or other user directly measures a temperature of a controlled object of a solder handling device 2 separately. Given that an actual temperature Tr is 395° C.

(5) The set-temperature manager appropriately rotate and adjust the knob 20 in such a manner that a temperature of the controlled object being directly measured separately (indicated value of a thermometer) converges to the given calibration temperature and becomes stable under control. If the actual temperature Tr is lower than the indicated set temperature by 5° C. as in the above example, the set-temperature manager will adjust an indicated set temperature to a scale value higher than the calibration temperature by about 5° C., to allow the deviation to be eventually corrected. However, in the analog-type temperature input configuration, it is difficult to rotate the knob 20 by an angle corresponding to 5° C., while looking at the temperature scale 67. Therefore, instead of looking at the temperature scale 67, the set-temperature manager checks the actually measured temperature the being measured separately, and adjusts the knob 20 to allow the actually measured temperature to conform to the calibration temperature.

(6) At a time when the actually measured temperature converge to the calibration temperature and becomes stable, the set-temperature manager re-presses the calibration offset button 18. Then, the control circuit 71 reads a temperature (second temperature T2) corresponding to a resistance value of the variable resistor 75 at that time, and stores a temperature difference (T1–T2) as an offset value $\Delta T$. In the above example, T2 is about 405° C., and the offset value $\Delta T$ is about −5° C. Then, the control circuit 71 terminates the calibration mode, and returns to a normal temperature control.

(7) In the subsequent normal temperature control, the control circuit 71 operates to add the offset value $\Delta T$ to a sensor temperature from the temperature sensor 4 to obtain a post-correction sensor temperature. In the above example, when the indicated set temperature is 400° C., the pre-correction sensor temperature is about 400° C., and the actual temperature Tr is 395° C. In this case, a correction operation of adding the offset value $\Delta T$ (~−5° C.) to the sensor temperature is performed to change the sensor temperature to about 395° C., so that post-correction sensor temperature becomes approximately equal to the actual temperature. Then, the control circuit 71 adjusts (in this case, increases) an amount of electric power to be supplied to the solder handling device 2 in such a manner to allow the sensor temperature to conform to 400° C. as the indicated set temperature, resulting in indicated set temperature[18] post-correction sensor temperature[18] actual temperature (=400° C.).

In the above process, for example, even if an indicated set temperature is deviated from a temperature corresponding to a resistance value of the variable resistor 75 due to device errors or the like, the deviation is included (added) as the offset value $\Delta T$, and thereby a correction effect equivalent to a case free of the deviation can be obtained.

In the first embodiment, the correction for any other indicated set temperatures is performed using the same offset value $\Delta T$. Alternatively, the calibration temperature may be set at two or more points to appropriately perform the correction using a plurality of different offset values $\Delta T$, depending on an indicated set temperature.

(8) After completion of the calibration, the set-temperature manager rotates the knob 20 to adjust the temperature scale 67 to a given set temperature, and then withdraws the temperature lock key 40. An operator performs a solder handling operation at the set temperature. Subsequently, even if the knob 20 is rotated by the operator, it will undergo a lost motion, so that the set temperature cannot be changed or calibrated without permission.

Figure 7:
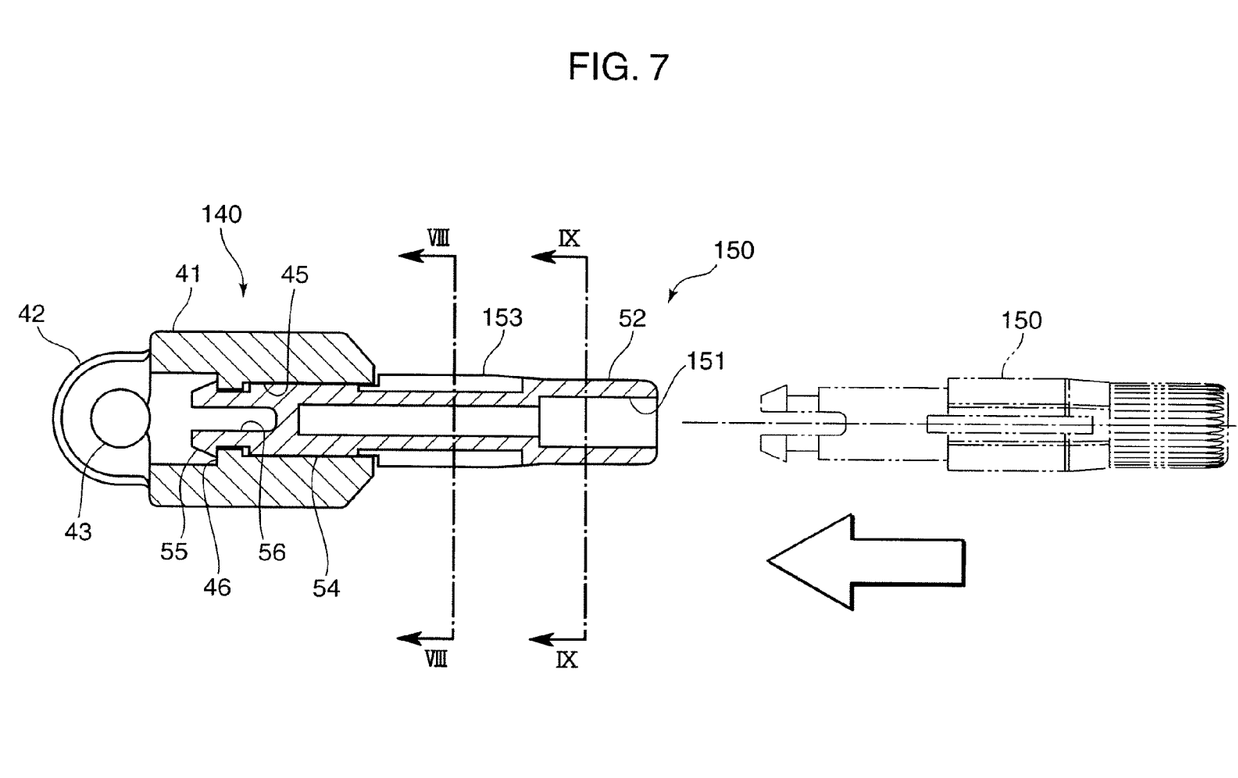
FIG. 7 is a vertical sectional view of a temperature lock key of a solder handling temperature controller according to a second embodiment of the present invention.
Figure 8:
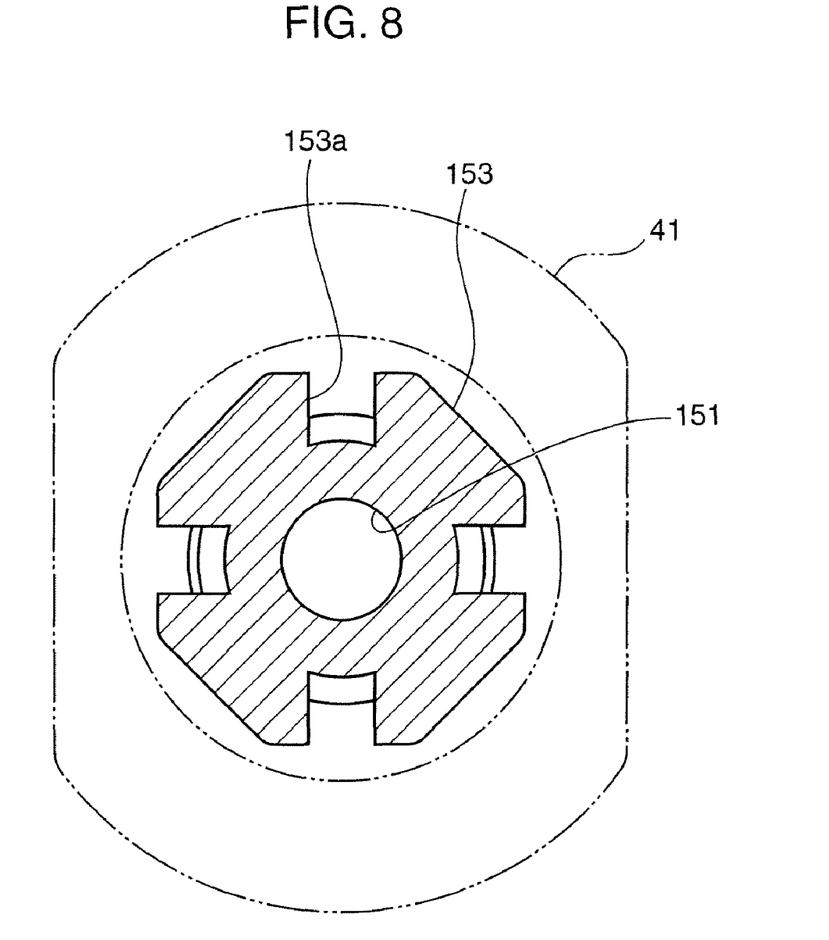
FIG. 8 is a sectional view taken along the line VIII-VIII in FIG. 7.
Figure 9:
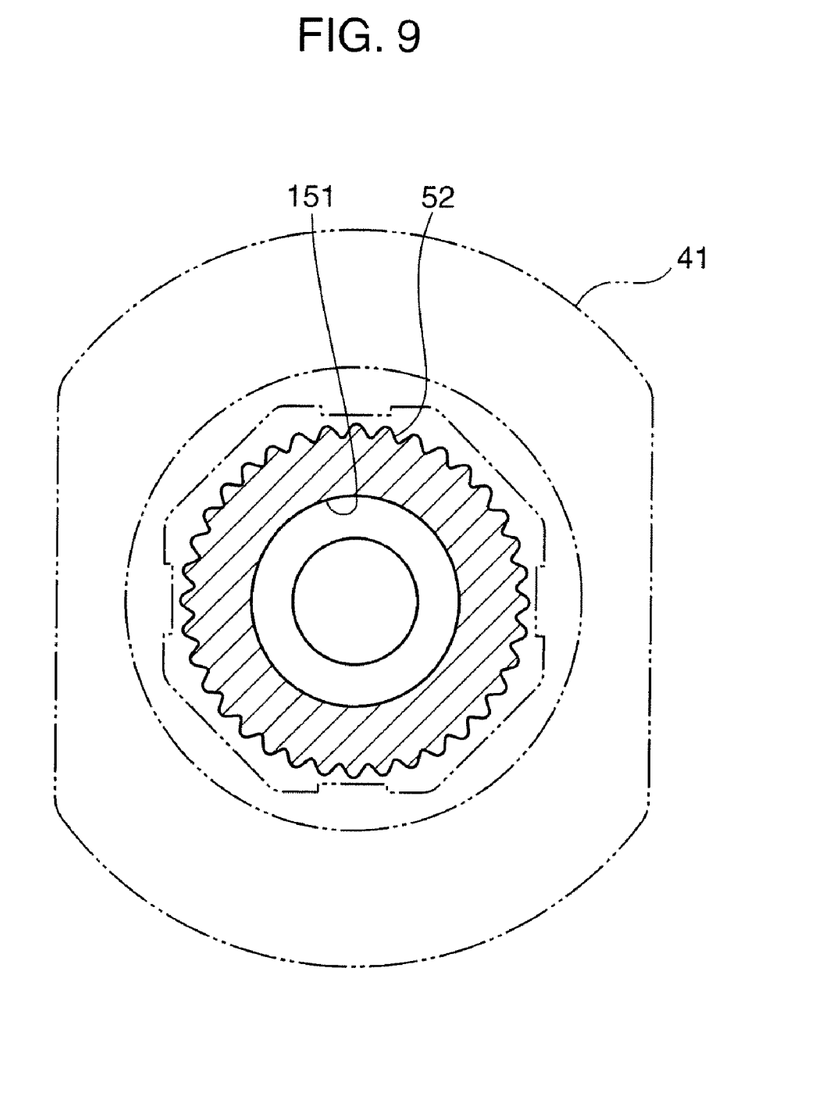
FIG. 9 is a sectional view taken along the line IX-IX in FIG. 7.

A second embodiment of the present invention will be described below. In the second embodiment, except that a temperature lock key 140 is different from the temperature lock key 40 in the first embodiment, a body 10 is the same as that in the first embodiment. In FIGS. 7 to 9, a member having a function identical or equivalent to that of the member in the first embodiment is defined by a common reference numeral or code, and its duplicate description will be omitted.

FIG. 7 is a vertical sectional view of the temperature lock key 140. The temperature lock key 140 primarily comprises a base end member 41, and a distal end member 150 prepared separately from the base end member 41. The distal end member 150 is primarily different from the distal end member 50 in the first embodiment in that it is made of a relatively hard resin material, and the iron core 59 is not provided therein.

The distal end member 150 has a first distal end portion 52 located on the side of a most distal end of the temperature lock key 140, and a second distal end portion 153 located on the side of the base end member 41 relative to the first distal end portion 52. A hole 151 is formed on a radially inward side of the first distal end portion 52, the second distal end portion 153 and a part of a distal end member-side base portion 54 to extend thereover.

FIG. 8 is a sectional view taken along the line VIII-VIII in FIG. 7. As shown in FIG. 8, an outer peripheral surface of the second distal end portion 153 has a generally octagonal shape. The hole 151 is formed on a radially inward side of the second distal end portion 153 to penetrate therethrough. As with the first embodiment, the outer peripheral surface of the second distal end portion 153 may have any polygonal shape other than an 8-sided shape.

FIG. 9 is a sectional view taken along the line IX-IX in FIG. 7. As shown in FIG. 9, an axial region of the first distal end portion 52 is formed as the hole 151 without any iron core penetrating therethrough.

A selection between the temperature lock key 40 in the first embodiment and the temperature lock key 140 in the second embodiment may be made in comprehensive consideration of a required strength of the distal end member, a strength (of a resin portion) of the distal end member, cost, etc.

The first and second embodiment of the present invention has been described. These embodiments discloses a solder handling temperature controller which is designed to control a solder handling device including a soldering iron to have a given set temperature, under a condition that it is in connected relation with the solder handling device or incorporated in the solder handling device. The solder handling temperature controller is characterized by comprising: a body of the solder handling temperature controller; a rotating shaft housed in the body and adapted to be rotatable about an axis thereof; a set temperature changing means adapted to change the set temperature according to a rotation angle of the rotating shaft; a rotary knob supported by the body in coaxial relation with the rotating shaft and in a rotatable manner relative to the rotating shaft; and a temperature lock key adapted to be selectively inserted into and withdrawable from the body in a position coaxial with the rotating shaft and the knob, and, in an inserted state thereof, to mechanically couple the rotating shaft and the knob together to allow them to be interlockingly rotated, wherein, in a state where the temperature lock key is withdrawn from the body, the coupling between the rotating shaft and the knob is released to prohibit the change of the set temperature by the rotation of the knob. This makes it possible to easily perform the establishment and release of temperature lock simply by the insertion and withdrawal of the temperature lock key.

The temperature lock key includes: a base end member located on the side of one of axially opposed ends thereof, and adapted, in the inserted state, to be exposed; and a distal end member located on the side of the other end, and adapted, in the inserted state, to be sunk into a side of the body which includes the knob, wherein the base end member and the distal end member are rotatable relative to each other about an axis of the temperature lock key, and wherein the coupling between the rotating shaft and the knob is established through the distal end member. This makes it possible to suppress shift of set temperature on inserting the temperature lock key.

The distal end member has a first distal end portion located on the side of a distalmost end of the temperature lock key, and a second distal end portion located on the side of the base end member relative to the first distal end portion, and wherein the first distal end portion is adapted, in the inserted state of the temperature lock key, to be coupled to the rotating shaft, and the second distal end portion is adapted, in the inserted state of the temperature lock key, to be coupled to the knob. This makes it possible to establish the coupling between the rotating shaft and the knob with a simple structure.

The solder handling temperature controller further comprises a scale board marked with a temperature scale and provided integrally and coaxially with the rotating shaft, wherein the scale board is adapted to be rotated integrally with the rotating shaft to indicate a set temperature according to the rotation angle of the rotating shaft, and wherein the first distal end portion is adapted, in the inserted state of the temperature lock key, to be coupled to the rotating shaft via the scale board. This makes it possible to establish the integral coupling between respective ones of the rotating shaft, the knob and the scale board with a simple structure.

The first distal end portion and one of the rotating shaft and the scale board are adapted, in the inserted state of the temperature lock key, to be coupled together through spline fitting by twenty or more spline grooves extending in an axial direction of the temperature lock key. This makes it possible to more effectively reduce shift of set temperature on inserting the temperature lock key.

The second distal end portion and the knob are adapted, in the inserted state of the temperature lock key, to be fitted and coupled together through fitting regions thereof having any one of six to ten-sided shapes in cross-section. This makes it possible to allow the second distal end portion and the knob to be adequately fitted together with a simple structure.

The solder handling temperature controller comprises: a scale board marked with a temperature scale and provided integrally and coaxially with the rotating shaft, wherein the scale board is adapted to be rotated integrally with the rotating shaft to indicate a set temperature according to the rotation angle of the rotating shaft; a control circuit adapted to receive information about a sensor temperature from a temperature sensor, provided in the solder handling device, operable to detect a temperature of a temperature control target portion wherein the control circuit is operable to execute a calibration mode for correcting a deviation between the set temperature indicated by the scale board, and an actual temperature of a controlled object; and a calibration switch adapted to be operated in the calibration mode, and wherein the control circuit is operable, in the calibration mode, to store, as an offset value, a difference between a controller-side set temperature at a time when the calibration switch is operated in a state just after the indicated set temperature is adjusted to a given calibration temperature, and a controller-side set temperature at a time when the calibration switch is operated in a state just after the rotating shaft is rotated so that the actual temperature is adjusted to the calibration temperature, and, during a temperature control after the calibration, to correct the sensor temperature with reference to the offset value in such a manner as to allow the actual temperature to converge to the post-adjustment indicated set temperature. This makes it possible to perform adequate calibration with a simple structure to allow a solder handling operation to be perform at an adequate temperature.

Although the present invention has been described based on the specific embodiments thereof, the present invention is not limited to the specific embodiments, but various changes and modifications may be made therein without departing from the spirit and scope of the present invention as set forth in appended claims.

For example, although the above embodiments have been described based on one example where a set-temperature manager is a user different from an operator, an operation scheme for the controller 1 is not limited thereto. As an example, an operator himself/herself may be a set-temperature manager. In this case, except during input, change or calibration of the set temperature, the temperature lock key 40 or the temperature lock key 140 can be withdrawn to prevent a hand of a person or an object from accidentally touch the knob 20 to cause a change in the set temperature, or cause uncertainty in current set temperature.

The invention claimed is:

1. A solder handling temperature controller designed to control a solder handling device including a soldering iron to have a given set temperature, under a condition that it is in connected relation with the solder handling device or incorporated in the solder handling device, the solder handling temperature controller comprising:
   a body of the solder handling temperature controller;
   a rotating shaft housed in the body and adapted to be rotatable about an axis thereof;
   a set temperature changing device adapted to change the set temperature according to a rotation angle of the rotating shaft;
   a rotary knob supported by the body in coaxial relation with the rotating shaft and in a rotatable manner relative to the rotating shaft; and
   a temperature lock key adapted to be selectively inserted into and withdrawable from the body in a position coaxial with the rotating shaft and the knob, and, in an inserted state thereof, to mechanically couple the rotating shaft and the knob together to allow them to be interlockingly rotated,
   wherein, in a state where the temperature lock key is withdrawn from the body, the coupling between the rotating shaft and the knob is released to prohibit a change of the set temperature by rotation of the knob.

2. The solder handling temperature controller as defined in claim 1, wherein the temperature lock key includes: a base end member located on a side of one of axially opposed ends thereof, and adapted, in the inserted state, to be exposed; and a distal end member located on a side of the other end, and adapted, in the inserted state, to be sunk into the body which includes the knob, wherein the base end member and the distal end member are rotatable relative to each other about an axis of the temperature lock key, and wherein the coupling between the rotating shaft and the knob is established through the distal end member.

3. The solder handling temperature controller as defined in claim 1, wherein the distal end member has a first distal end portion located on a most distal end of the temperature lock key, and a second distal end portion located on a side of the base end member relative to the first distal end portion, and wherein the first distal end portion is adapted, in the inserted state of the temperature lock key, to be coupled to the rotating shaft, and the second distal end portion is adapted, in the inserted state of the temperature lock key, to be coupled to the knob.

4. The solder handling temperature controller as defined in claim 3, which further comprises a scale board marked with a temperature scale and provided integrally and coaxially with the rotating shaft, the scale board being adapted to be rotated integrally with the rotating shaft to indicate a set temperature according to the rotation angle of the rotating shaft, and wherein the first distal end portion is adapted, in the inserted state of the temperature lock key, to be coupled to the rotating shaft via the scale board.

5. The solder handling temperature controller as defined in claim 3, wherein the first distal end portion and one of the rotating shaft and the scale board are adapted, in the inserted state of the temperature lock key, to be coupled together through spline fitting by twenty or more spline grooves extending in an axial direction of the temperature lock key.

6. The solder handling temperature controller as defined in claim 3, wherein the second distal end portion and the knob are adapted, in the inserted state of the temperature lock key, to be fitted and coupled together through fitting regions thereof having any one of six to ten-sided shapes in cross-section.

7. The solder handling temperature controller as defined in claim 1, which further comprises:
   a scale board marked with a temperature scale and provided integrally and coaxially with the rotating shaft, the scale board being adapted to be rotated integrally with the rotating shaft to indicate a set temperature according to the rotation angle of the rotating shaft;
   a control circuit adapted to receive information about a sensor temperature from a temperature sensor, provided in the solder handling device, operable to detect a temperature of a temperature control target portion the control circuit being operable to execute a calibration mode for correcting a deviation between the set temperature indicated by the scale board, and an actual temperature of a controlled object; and
   a calibration switch adapted to be operated in the calibration mode,
   and wherein the control circuit is operable, in the calibration mode, to store, as an offset value, a difference between a controller-side set temperature at a time when the calibration switch is operated in a state just after the indicated set temperature is adjusted to a given calibration temperature, and a controller-side set temperature at a time when the calibration switch is operated in a state just after the rotating shaft is rotated so that the actual temperature is adjusted to the calibration temperature, and, during a temperature control after the calibration, to correct the sensor temperature with reference to the offset value in such a manner as to allow the actual temperature to converge to the post-adjustment indicated set temperature.

* * * * *